United States Patent [19]

King et al.

[11] Patent Number: 4,993,912
[45] Date of Patent: Feb. 19, 1991

[54] STAIR CLIMBING ROBOT

[75] Inventors: Edward G. King, Baltimore; Hilmer H. Shackelord, Jr., Finksburg; Leo M. Kahl, Baltimore, all of Md.

[73] Assignee: Chamberlain MRC, Division of Duchossois Industries, Inc., Elmhurst, Ill.

[21] Appl. No.: 453,315

[22] Filed: Dec. 22, 1989

[51] Int. Cl.⁵ .............................................. B25J 5/00
[52] U.S. Cl. ..................................... 414/729; 180/8.2; 280/5.28; 901/47
[58] Field of Search ...................... 414/729; 901/1, 47; 180/8.2, 8.3, 246, 6.5; 280/5.28

[56] References Cited

U.S. PATENT DOCUMENTS

| | | | |
|---|---|---|---|
| 2,931,449 | 4/1960 | King | 180/8 A |
| 3,283,839 | 3/1965 | Brown et al. | 180/8 A |
| 3,299,978 | 1/1967 | Spensler | 180/9.52 |
| 3,348,518 | 10/1967 | Forsyth et al. | 180/8.2 X |
| 3,580,344 | 5/1971 | Floyd | 180/8.2 |
| 4,421,189 | 12/1983 | Watkins et al. | 180/8 A |
| 4,512,588 | 4/1985 | Cox | 280/5.26 |
| 4,621,562 | 11/1986 | Carr et al. | 414/729 X |
| 4,636,137 | 1/1987 | Lemelson | 901/1 X |
| 4,709,265 | 11/1987 | Silverman et al. | 901/1 X |

Primary Examiner—Robert P. Olszewski
Assistant Examiner—Donald W. Underwood
Attorney, Agent, or Firm—Lowe, Price, LeBlanc, Becker & Shur

[57] ABSTRACT

A stair climbing robot and method of operation is described. The robot includes a chassis having powered opposed front wheels and two pairs of rear wheels each pair being rotatably mounted on a beam at opposite ends thereof, and each beam being rotatably mounted on the chassis. A drive motor is provided for driving each pair of wheels in the same direction at a predetermined rotational velocity and a drive means is provided for simultaneously rotating the beams at a predetermined rotational velocity and in a predetermined direction. The method of operation to climb stairs includes the steps of activating the rotation of the beams in a forward direction while causing each pair of rear wheels to rotate in an opposite direction at the same rotational velocity. In this way, forward movement is achieved by action of the front wheels and the rotating beams and the rotational velocity of the rear wheels relative to the terrain will be zero.

10 Claims, 5 Drawing Sheets

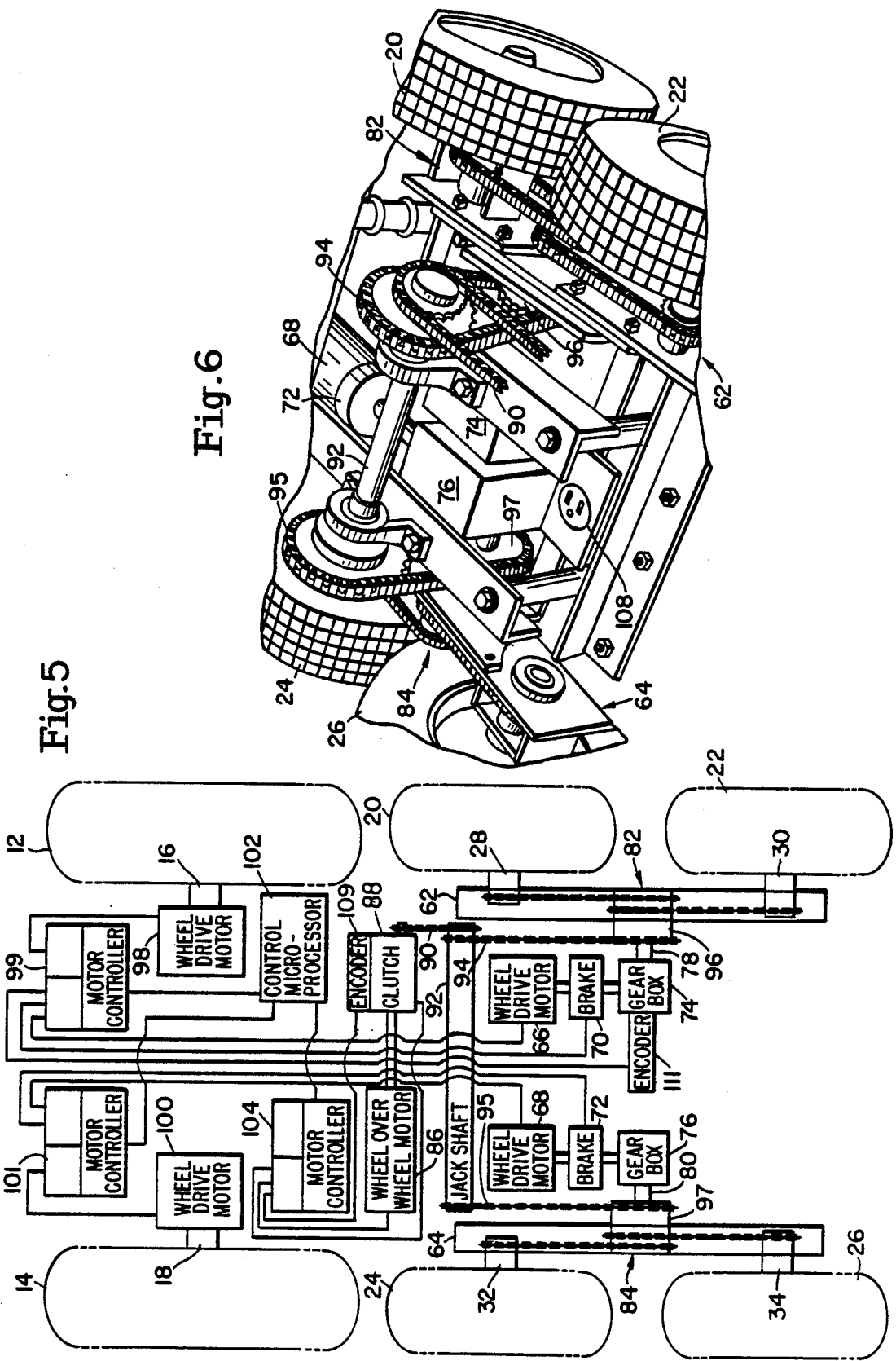

STAIR CLIMBING ROBOT

FIELD OF THE INVENTION

This invention relates to a mobile robot and in particular to a remote controlled vehicle capable of negotiating a wide variety of terrain features including climbing stairs. The stair climbing feature utilizes a wheel over wheel mechanism.

DESCRIPTION OF RELATED ART

Remote control vehicles which utilize a wheel over wheel mechanism are known. For example, in U.S. Pat. No. 3,299,978 a remote controlled vehicle which utilizes a wheel over wheel mechanism is described. In that vehicle however, four pairs of such wheels were provided and the actuator was a hydraulic cylinder. The preferred embodiment did not contemplate a 360° revolution of the mechanism although the description indicates that such a mechanism could be substitute for the hydraulic cylinders shown. The device shown then was an electro mechanical device intended to negotiate terrain features by using the wheel over wheel design to raise or lower the chassis. It was contemplated that the hydraulic cylinders could either serve as a damping shock absorber, or could be used to lock one or more of the wheels in each pair in a raised position to thereby change the attitude of the chassis to accommodate different terrain features.

A wheel over wheel or spider of wheels has been a feature of various wheelchair designs also. A number of prior patents including prior U.S. Pat. Nos. 2,931,449, 3,283,839, 3,580,344, 4,421,189 and 4,512,588 describe different types of wheel over wheel designs for wheelchairs. These prior patents in general describe a single pair of front wheels, and a spider of rear wheels or a pair of spiders. The spiders may be comprised of 3, 4 or more wheels spaced about a common axle. These devices however are not remote controlled, and are intended to be operated by a driver seated therein.

SUMMARY OF THE INVENTION

The device of this invention includes a chassis with a pair of front wheels and two pairs of rear wheels, in the preferred embodiment. The front wheels are separately powered, and as are each pair of rear wheels. Each pair of rear wheels is rotatably mounted on a longitudinal beam. The beams are then interconnected by a central jack shaft. The wheel over wheel function then is provided by a separate motor which rotates the jack shaft which in turn rotates the wheels.

In a preferred embodiment, a turret mounts an arm which can itself mount a variety of different devices such as a claw, a camera, a light, a microphone and speaker, and if desired, a weapon such as a shotgun. The functions of the implements mounted on the turret as well as the drive motors, are all remote controlled.

It has further been discovered that the unique stair climbing function of the device of this invention is provide by rotating the rear wheels in a direction opposite the direction of rotation of the jack shaft during the wheel over wheel function. Furthermore, by utilizing a microprocessor control, the velocity of rotation of the rear wheels is matched with the velocity of rotation of the jack shaft so that the rear wheels which remains in contact with the terrain have a zero rational velocity relative to the terrain, and forward movement is provided by the rotation of the front wheels and the wheel over wheel mechanism. This method of operation has been found to greatly facilitate the stair climbing function.

If the rear wheels are rotated in the same direction as the jack shaft, the wheel over wheel function can be defeated when the wheels lock onto or abut the stair risers. In the alternative, even if the wheel over wheel function is not defeated, as will be subsequently described, greatly increased power drains occur.

Accordingly, it is an object of this invention to provide a mobile robot which is remote controlled and capable of climbing stairs.

It is yet another object of this invention to provide a remote controlled robot which utilizes a wheel over wheel mechanism in order to facilitate climbing stairs and which mounts a rotating turret which can carry a variety of implements such as a claw, lights, speaker, microphone, camera and the like.

It is yet another object of this invention to provide a remote controlled robot vehicle which uses a wheel over wheel mechanism for stair climbing in which during the wheel over wheel operation, the velocity of rotation of the individual wheels in said mechanism is matched with the velocity of rotation of the wheel over wheel mechanism, and in an opposite direction to facilitate stair climbing.

These and other objects will become readily apparent with reference to the drawings and following description wherein:

BRIEF DESCRIPTION OF DRAWINGS

FIG. 5 is a simplified schematic view of the chassis of the device of this invention.

FIG. 6 is a fragmentary perspective view of the wheel over wheel mechanism of this invention.

DETAILED DESCRIPTION OF THE INVENTION

Figure 1:
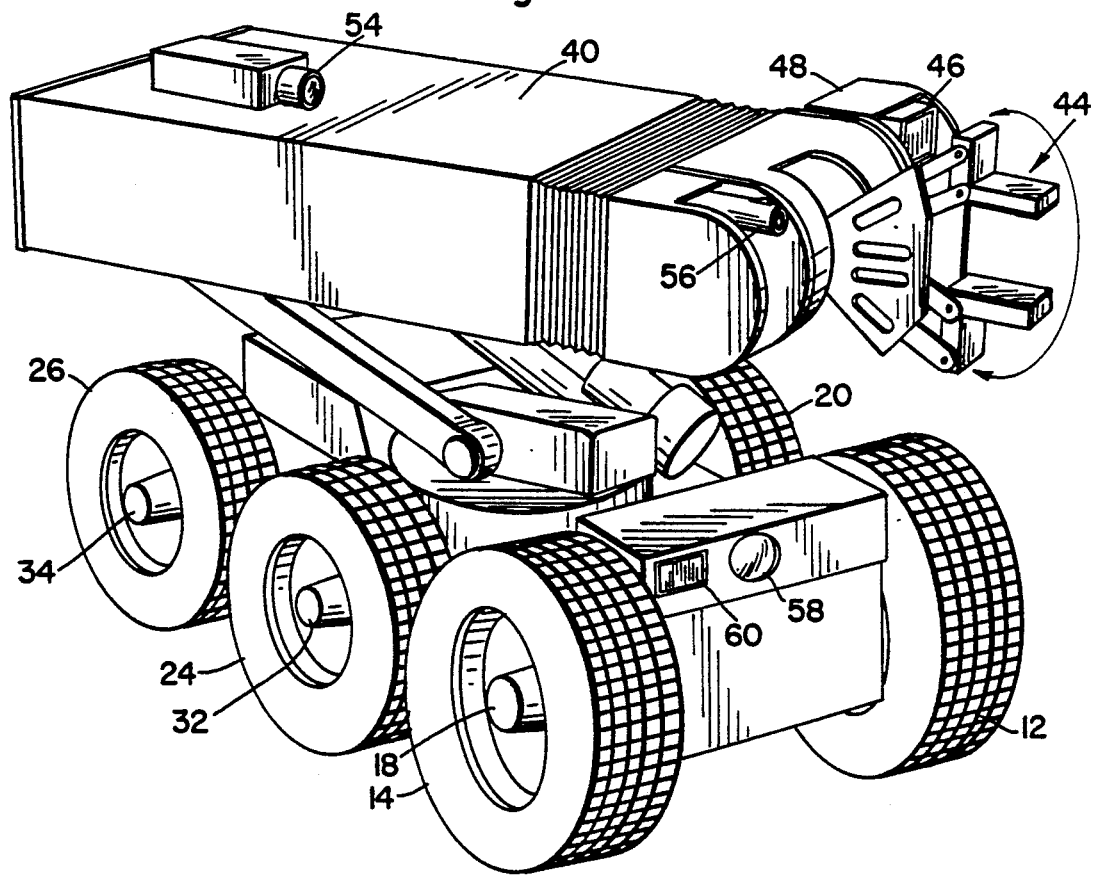
FIG. 1 is a perspective view of a embodiment of the device of this invention.

With attention to FIG. 1 the device of this invention includes a chassis 10 with separately rotatably mounted front wheels 12 and 14 on axles 16 and 18 respectively. There are also provided two pairs of rotatably mounted rear wheels 20 and 22 and 24 and 26. The rear wheels are rotatably mounted by axles, respectively, 28 and 30 and 32 and 34 (see FIG. 2).

Each front wheel 12 and 14 is separately powered and controlled both as to the speed of rotation and the direction thereof. Likewise, each pair of rear wheels, 20 and 22 and 24 and 26 are separately powered both as to the direction of rotation and the speed. Therefore, if the vehicle is to turn a corner, the wheels on one side are caused to rotate in a direction opposite the wheels on the other side. In this way the vehicle can turn about a central axis 360°.

A rotatable turret 36 drive by motor 37 is mounted on chassis 10. Turret 36, in turn, preferably mounts a leg 38 and an arm 40. The arm 40 is caused to pivot about its juncture (not shown) with leg 38 by the telescoping, pivotally mounted support arm 42. A variety of conventional remote control attachments can be provided on turret 40. The following are intended to be exemplary of such attachments in the preferred embodiment and not intended to limit the instant invention thereto. For example, a claw 44 can be provided which opens, closes and rotates. A claw light 46 can also be provided as well as a camera 48. A speaker 50 and microphone 52 are also shown. Furthermore, an additional camera 54 and light 55 (FIG. 7) can be provided as well as a shotgun 56 mounted on the arm 40.

In the alternative, or in addition to the foregoing, a camera 58, and light 60 can be mounted on chassis 10.

Figure 4:
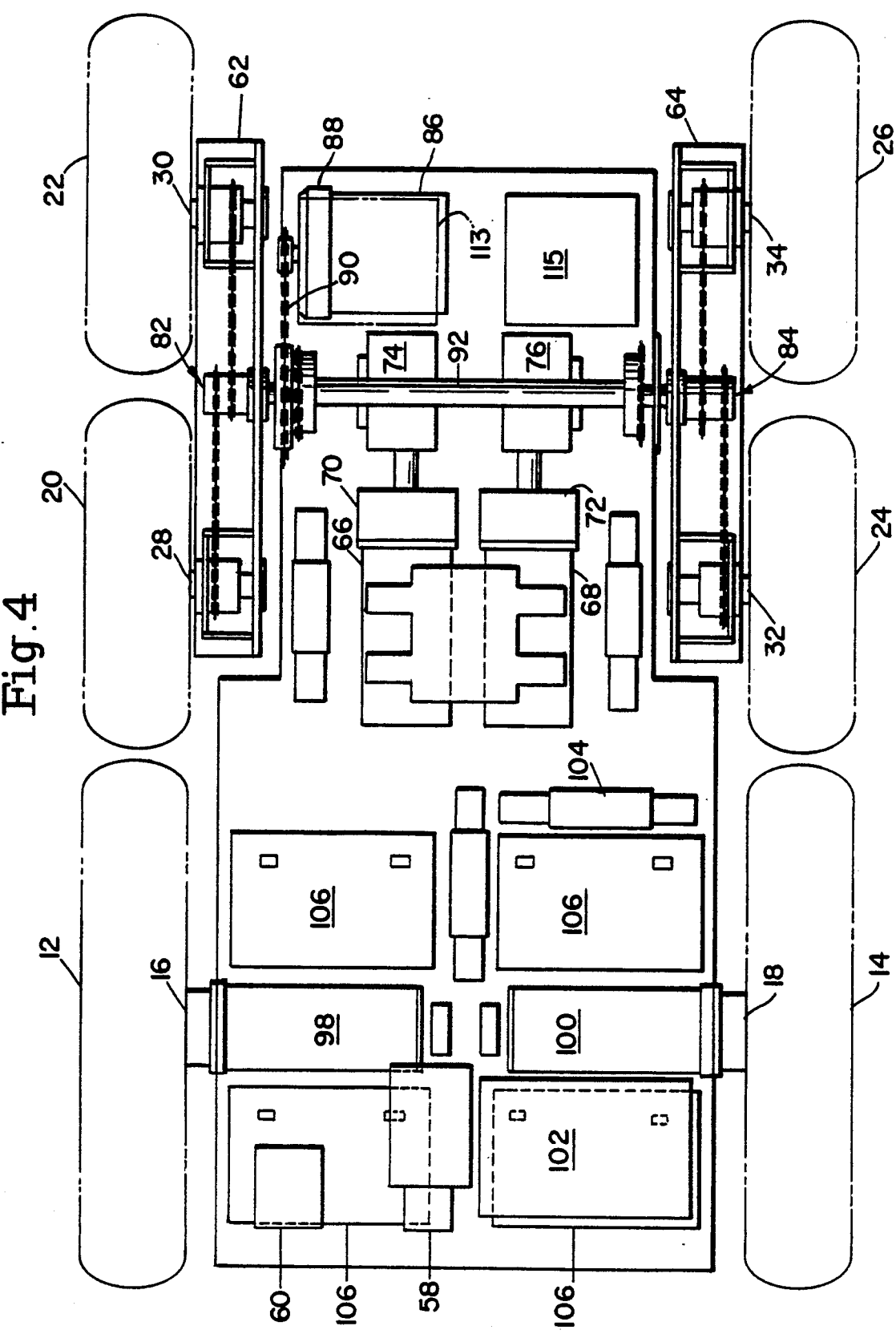
FIG. 4 is a schematic view of the chassis of the device of this invention.

With attention to FIGS. 4, 5 and 6, the wheel over wheel assembly shown in fragmentary view in FIG. 6 and schematically in FIGS. 4 and 5, includes hollow beams 62 and 64 which rotatably mount at either end, respectively, axles 28 and 30, and axles 32 and 34. Wheel drive motors 66 and 68 are coupled through respective 70 and 72 to gear boxes 74 and 76. Drive shafts 78 and 80 then extend into the hollow beams 62 and 64 so that the output of the wheel drive motors 70 and 72 is ultimately coupled through chain drive 82 and 84 to, respectively axles 28 and 30 and axles 32 and 34, to drive the wheels. As will be subsequently explained, wheel drive motors 66 and 68 are separately controlled.

The wheel over wheel motor 86 is coupled through a clutch 88 and chain drive 90 to a jack shaft 92. Jack shaft 92 is then coupled through chain 94 to a sprocket wheel 96 which is affixed to the housing 62. When clutch 88 then is engaged whereby the output from the wheel over wheel motor is translated through chain drives 90 and 94 to sprocket wheel 96 which rotatably surrounds shaft 78 and is fixed to hollow assembly 62, the entire assembly including the hollow beam 62 and wheels 20 and 22 will rotate about shaft 78. Similarly, a chain drive 95 couples the jack shaft to a companion sprocket wheel 97 which rotatably surrounds output shaft 80 and is affixed to hollow assembly 64. Therefore, the assemblies will rotate simultaneously at the same speed about the respective shaft 78 and 80. Meanwhile, wheel drive motor 66 and 68 will continue to cause, respectively, wheels 20 and 22, and 24 and 26, to rotate in the direction desired. Similarly, wheel 12 is driven by motor 98 and wheel 14 is driven by motor 100. Controllers 99 and 101, respectively, are provided for controlling the respective motors 98 and 100 which in turn are coupled to a control microprocessor 102 which controls the speed and direction of rotation of wheels 12 and 14. Microprocessor 102 also is coupled through a controller 104 to the wheel over wheel motor and as will be subsequently explained to other operative portions of the device. The source of energy for operating the device of this invention is preferably four batteries 106 which may be coupled to a source of alternating current for recharging at outlet 108.

OPERATION

When the device of this invention is travelling in its normal operating mode, clutch 88 disengages the wheel over wheel motor 86 so that the middle and rear wheels are free to float or rotate with changes in terrain. This allows the vehicle's suspension configuration to better match the terrain over which the vehicle is travelling.

Figure 2:
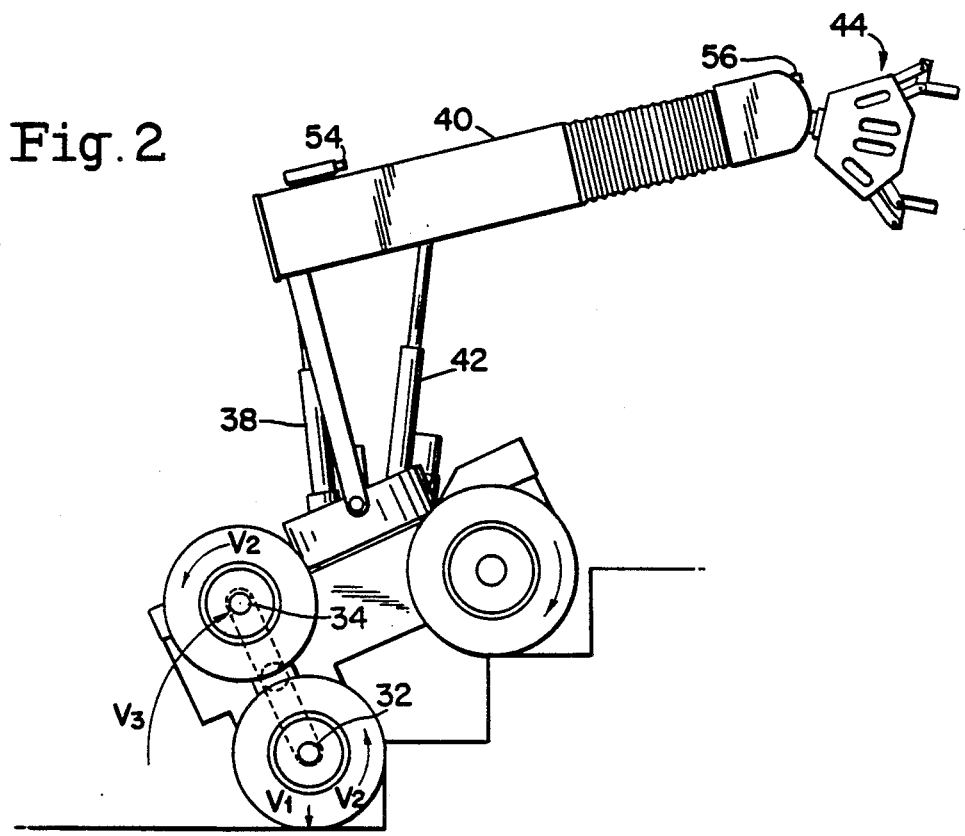
FIG. 2 is a side view of the device of this invention illustrating the wheel over wheel mechanism in a stair climbing attitude.
Figure 3:
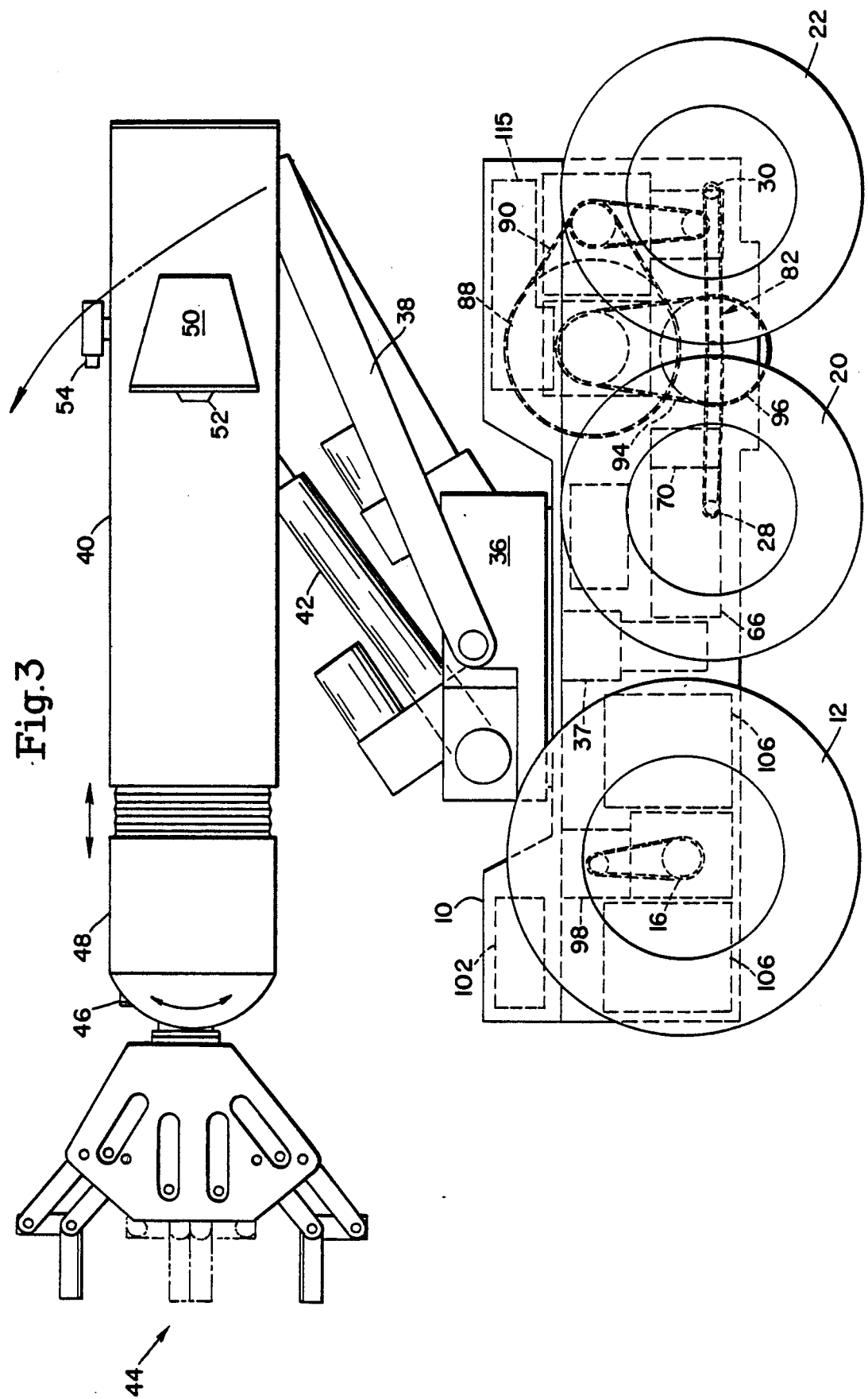
FIG. 3 is a side view of the device of this invention with various drive components shown in phantom.

When the vehicle needs to climb a staircase or similar obstacle the operator signals the control system 102 to engage the clutch and couple the motor 86 to sprocket wheels 96 and 97. This causes the hollow beams 62 and 64 to rotate. If the wheel over wheel is actuated in a forward direction, the middle and rear wheels are independently driven in a reverse direction as shown in FIG. 2 at a speed such that whichever wheel of the wheel over wheel assembly on each side which is in contact with the terrain has a zero rotational motion relative to the terrain surface. This is accomplished by matching the speed of rotation of the individual wheels with the rotational speed of the wheel over wheel assembly. For example, with reference to FIG. 2, V1 is the velocity of the wheel 24 with respect to the surface. V2 is the velocity of wheel 24 about is axle 32 and V3 is the velocity of the hollow beam 64 about its axis, or, in fact, the velocity of rotation of sprocket wheel 97. If V2 equals V3 then $V1 = \pi D (V3 - V2) = 0$. When V3 equals V2 forward motion of the vehicle is accomplished by rotation of the rear wheel over wheel beams 62 and 64 and motion of the front drive wheels 12 and 14.

If the direction of V2 is reversed, V1 is then greater than 0 in a forward direction. In that case the one of the two rear drive wheels engaging the step advances on the step, and if the step is of a certain construction, this powered wheel can physically lock up with the step. The force that had been driving the wheel now turns into a reverse acting reaction couple which works in opposition to the wheel over wheel concept. Given the proper geometry and other conditions it can defeat the wheel over wheel and even when it is not defeated, power drain is substantially increased due to the opposition of forces. This reaction couple can act to lift the vehicle's two front wheels 12 and 14 off of the terrain and on occasions it has been observed that this reaction couple will actually cause the unit to flip on its back. Therefore, the matching of V2 and V3 in opposite directions is critical to the success of the wheel over wheel system.

If the rear drive wheels are unpowered during the wheel over wheel operation, the unit fails to climb as soon as the front wheels bog down, due to insufficient torque of the front wheel drive or the front wheels physically jamming into the obstacle. The wheel over wheel continues rotation but each wheel in succession helplessly rolls off the edge of the step and nothing is gained.

During wheel over wheel operation then the machine operator selects wheel over wheel operation and the controller microprocessor 102 commands the motor controller 104 to operate the wheel over wheel motor 86. The control microprocessor 102 then continues to monitor via encoders 109 and 111 the angular rotation of the wheel over wheel assembly and the rotation of the middle and rear wheels. From the data of relative speed and direction to angular position (derived from an experimental tests), the motion of the wheel over wheel traction motor 86 is controlled by the control microprocessor 102 to optimize stability and climbing ability and to match the velocities V2 and V3 in opposite directions.

Figure 7:
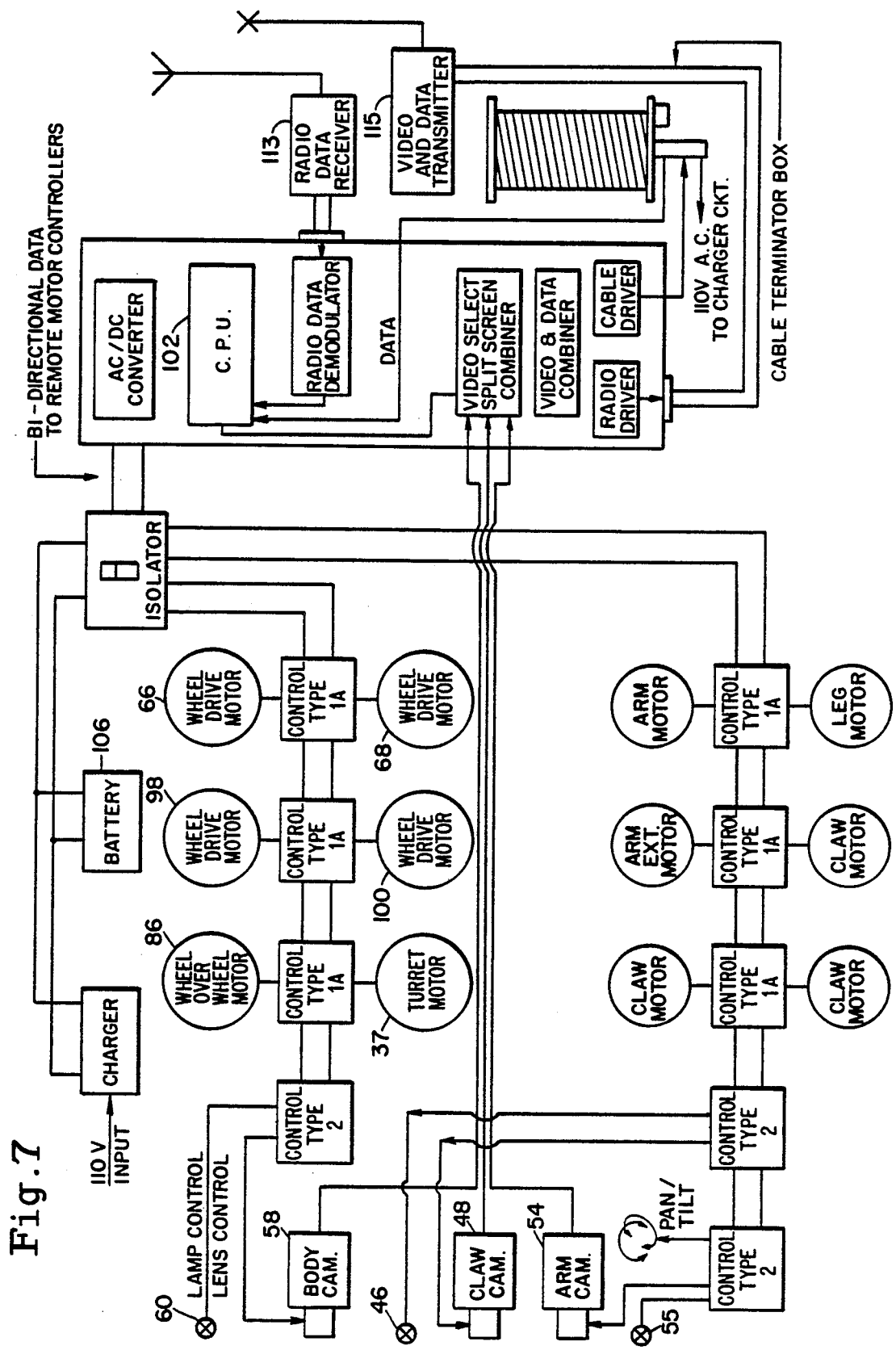
FIG. 7 is a block diagram of the operational components of the device of this invention.

FIG. 7 is a simplified block diagram illustrating the control system for the wheel drive motors 66, 68, 98 and 100, and for the turret motor 37 as well as the wheel over wheel motor 86. In addition, also shown is the control system for the claw motors (not shown) arm and leg motors (not shown) and arm extension motor (not shown), as well as the control systems for the camera 58 and light 60 mounted on the body or chassis, a camera 48 and light 46 mounted on the claw and the camera 54 and light 55 mounted on the arm 40.

As shown in FIG. 7 the device of this invention can be remote controlled via a radio data receiver 113. The operator from a remote location will receive video and data input from transmitter 115 and send appropriate signals through receiver 113 ultimately to the central processing unit 102. The central processing unit 102 then signals the various controls to carry out the functions intended.

As noted above, the central processing unit also receives data from and monitors the wheel motors so that when the wheel over wheel mode is engaged, the direction of rotation of wheels 20 and 22, and 24 and 26 will be the reverse of the wheel over wheel direction of rotation and the velocities thereof will be matched.

In actual operation of an embodiment of the device of this invention the device successfully climbed a staircase disposed at a 20° angle, a second staircase disposed at a 33° angle, and a third staircase disposed at a 40° angle to the horizontal.

In summary, there is disclosed herein a remote control robot vehicle which may have a variety of accessory attachments for achieving different functions, mounted thereon. The vehicle of this invention however utilizes a wheel over wheel system and method of operation whereby it can successfully climb stairways and similar obstacles efficiently and without an undue power drain.

The device of this invention is intended to be operated by rechargeable batteries, but as will be obvious to those skilled in the art, any conventional power system could be used. Furthermore, although the attachments for the robotic arm included a claw, cameras, lights, a microphone, a speaker, and possibly a weapon. It will be obvious to those skilled in the art that conventional attachments such as these are described as an example and are not intended to be limitive of the invention herein.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims ar therefore intended to be embraced therein.

We claim:

1. A robot vehicle adapted to climb stairs and similar obstacles comprising:

an elongated chassis having a front, back, sides and top and a pair of front wheels rotatably mounted on opposite sides thereof;

a pair of beams rotatably mounted on opposite sides of said chassis each beam extending from the center toward the rear of the chassis whereby the axis of rotation of each beam is contained in a plane perpendicular to the planes containing each of said front wheels;

a first and a second pair of wheels, one rotatably mounted at each end of each beam whereby when said beams are horizontal and said six wheels rest on a horizontal surface the longitudinal axis of said chassis will be substantially horizontal;

reversible first and second front drive means coupled respectively to each of said front wheels for selectively rotating said wheels;

reversible first and second rear drive means coupled respectively for selectively rotating each pair of wheels mounted on each beam whereby each wheel in a pair is rotated in the same direction and the same rotational velocity;

reversible wheel over wheel drive means coupled to each beam for selectively causing said beams to rotate in the same direction and at the same velocity; and control means coupled to each of said drive means for sensing and controlling the direction of rotation and rotational velocity of each wheel and for engaging the wheel over wheel drive means to rotate said beams in one direction at a first rotational velocity and to rotate each of said pairs of wheels in an opposite direction at the same rotational velocity.

2. The vehicle of claim 1 further comprising clutch means coupled between said wheel over wheel drive means and said beams for causing said drive means to drivingly engage and rotate or disengage said beams responsive to a signal from said control means.

3. The vehicle of claim 2 further comprising:

a turret rotatably mounted on the top of said chassis and turret drive means coupled thereto and to said control means for rotating said turret in a predetermined direction in response to a signal from said control means.

4. The vehicle of claim 3 further comprising; an arm having an end pivotally mounted on said turret and an opposite free end and means coupled thereto for raising the free end of said arm.

5. The vehicle of claim 4 further comprising a claw rotatably mounted on the free end of said arm, said claw having pivotally interconnected jaws and means coupled to said jaw and to said control means for selectively opening and closing said jaw and rotating said jaw responsive to a signal from said control means.

6. The vehicle of claim 5 further comprising a receiver means coupled to said control means for receiving remote command signals.

7. The vehicle of claim 6 further comprising light and camera means carried thereby for viewing a predetermined area relative to said vehicle and for generating a video signal and transmitter means for transmitting said video signal to a remote location.

8. The vehicle of claim 7 further comprising microphone means carried thereby for generating an audio signal and coupled to said transmitter means, said transmitter means further comprising means for transmitting said audio signal to the remote location.

9. The vehicle of claim 8 further comprising speaker means for receiving an audio signal and generating the sound responsive thereto, said speaker means coupled to said receiver means, said receiver means further comprising means for receiving an audio signal from the remote location and transmitting the same to said speaker means.

10. In an improved method for operating a wheel over wheel vehicle to climb a stair or similar terrain obstacle wherein the vehicle has a pair of powered front wheels and two pairs of rear wheels each wheel rotatably mounted on a beam at either end thereof and each beam rotatably mounted on said vehicle and drive means for rotating each pair of wheels in a predetermined direction and at a predetermined velocity and for rotating the beams in a predetermined direction and at a predetermined velocity the improvement comprising;

rotating said beams in a predetermined direction and at a predetermined rotational velocity and rotating said rear wheels in an opposite direction and at the same rotational velocity whereby the rotational velocity of the rear wheels resting on the terrain relative thereto will be zero and movement is achieved by action of the front wheels and rotating beams.

* * * * *